United States Patent [19]

Miyake et al.

[11] Patent Number: 5,767,025
[45] Date of Patent: Jun. 16, 1998

[54] COMPOSITE POWDER COMPRISING SILICON NITRIDE AND SILICON CARBIDE

[75] Inventors: Kazumi Miyake; Kagehisa Hamazaki; Hitoshi Toyoda; Yoshikatsu Higuchi, all of Saitama-ken, Japan

[73] Assignee: Honda Giken Kogyo Kabushiki Kaisha, Tokyo, Japan

[21] Appl. No.: 625,043

[22] Filed: Mar. 29, 1996

Related U.S. Application Data

[63] Continuation-in-part of Ser. No. 413,445, Mar. 30, 1995, abandoned.

[30] Foreign Application Priority Data

| Mar. 30, 1994 | [JP] | Japan | 6-084162 |
| Nov. 29, 1994 | [JP] | Japan | 6-319037 |
| Mar. 30, 1995 | [JP] | Japan | 7-098064 |
| Nov. 14, 1995 | [JP] | Japan | 7-319737 |

[51] Int. Cl.$^6$ ............... C04B 35/565; C04B 35/584
[52] U.S. Cl. ............. 501/92; 501/97.1; 501/97.2
[58] Field of Search ............... 501/92, 97, 98, 501/97.1, 97.2

[56] References Cited

U.S. PATENT DOCUMENTS

| 4,800,182 | 1/1989 | Iazaki et al. | 501/92 |
| 5,352,641 | 10/1994 | Matsui et al. | 501/92 |
| 5,525,556 | 6/1996 | Dunmeead et al. | 501/92 |
| 5,559,062 | 9/1996 | Okabe et al. | 501/92 |
| 5,618,768 | 4/1997 | Higuchi et al. | 501/92 |

FOREIGN PATENT DOCUMENTS

| 2-160669 | 6/1990 | Japan. |
| 3-103361 | 4/1991 | Japan. |
| 3-261611 | 11/1991 | Japan. |

*Primary Examiner*—Karl Group
*Attorney, Agent, or Firm*—Birch, Stewart, Kolasch & Birch, LLP

[57] ABSTRACT

A composite sintered body of silicon nitride and silicon carbide is manufactured by sintering a composite powder or green body of silicon nitride and silicon carbide in a nitrogen gas atmosphere. The composite powder having a percentage of α-silicon nitride which is at least 30% based on all silicon nitride is produced by mixing a silicon powder with a carbonaceous powder and a sintering aid powder, and heat-treating the resultant mixed powder in a nitrogen-containing atmosphere at a temperature of 1,450° C. or lower thereby nitriding and carbonizing silicon contained in the mixed powder to produce a composite powder, a temperature elevation speed being less than 2° C./minute. The composite green body having a percentage of α-silicon nitride which is at least 30% based on all silicon nitride is produced by mixing a silicon powder, a carbonaceous powder and a sintering aid powder, molding the resultant mixed powder into a green body, and heat-treating the resultant green body in a nitrogen-containing atmosphere at a temperature of 1,450° C. or lower thereby nitriding and carbonizing silicon contained in the green body, a temperature elevation speed being less than 2° C./minute.

3 Claims, 2 Drawing Sheets

500 nm

COMPOSITE POWDER COMPRISING SILICON NITRIDE AND SILICON CARBIDE

This application is a continuation-in-part of application Ser. No. 08/413,445 filed on Mar. 30, 1995 now abandoned, the entire contents of which are hereby incorporated by reference.

BACKGROUND OF THE INVENTION

The present invention relates to composite powder, green body and sintered body of silicon nitride and silicon carbide, more particularly to a composite powder and green body suitable for the production of a nano-composite sintered body with excellent mechanical strength, hardness, toughness, thermal shock resistance, wear resistance, corrosion resistance, etc., and a method of manufacturing such nano-composite sintered body.

Description of the Prior Art

Sintered ceramics of silicon nitride are expected to find applications as structural ceramics for use under severe conditions at high temperatures because of their high mechanical strength, heat resistance, thermal shock resistance and wear resistance. While various additives are added to improve the mechanical strength of the sintered ceramics, silicon carbide is one of the most promising ceramic additives for providing the sintered ceramics with high resistance to oxidation and mechanical strength at high temperatures.

Therefore, there have been proposed sintered silicon nitride ceramics containing silicon carbide. However, usual sintered ceramics produced from a simple mixture of silicon nitride powder and silicon carbide powder contain silicon carbide particles on the order of microns only in the grain boundaries of silicon nitride particles, failing to have nano-composite structures. Or even if they have nano-composite structures, there are only few percentages of silicon carbide particles contained in the silicon nitride particles. Under such circumstances, there have been attempted to provide various processes for producing sintered ceramics having nano-composite structures in which silicon carbide particles are finely dispersed in silicon nitride particles.

Japanese Patent Laid-Open No. 2-160669 discloses a composite sintered body of silicon nitride and silicon carbide having a microstructure wherein silicon carbide particles having an average diameter of 1 μm or less are dispersed in the grain boundaries, and finer silicon carbide particles having sizes ranging from several nanometers to several hundred nanometers are dispersed in silicon nitride particles. This composite sintered body is produced from a composite powder of amorphous silicon nitride and silicon carbide or a mixed powder of silicon nitride and silicon carbide by a liquid-phase sintering at a temperature ranging from 1,500° C. to 2,300° C. in the presence of a sintering aid powder. In the liquid phase sintering process, fine silicon nitride particles having an average diameter of 0.5 μm or less are produced. However, the composite powder of amorphous silicon nitride and silicon carbide, which is produced by a vapor phase reaction of an organic silicon compound, is extremely expensive and not suitable for mass-production. Another problem is that the amorphous powder has poor moldability. Also, what is specifically disclosed thereby as a mixed powder of silicon nitride and silicon carbide is a mixture of amorphous silicon nitride powder produced by a similar process to the above and silicon carbide powder, and such mixture suffers from similar disadvantages.

Japanese Patent Laid-Open No. 3-103361 discloses a composite sintered body of a silicon nitride matrix containing as a reinforcing material fine silicon carbide particles having two particle size distributions of 1 μm or less and 5–20 μm. Since this composite sintered body is produced by mixing silicon nitride powder and silicon carbide powder, it does not have a nanocomposite structure in which fine silicon carbide particles are uniformly dispersed in silicon nitride particles.

Japanese Patent Laid-Open No. 3-261611 discloses a process of manufacturing a composite powder for the manufacture of a composite sintered body of silicon nitride and silicon carbide, which comprises the steps of mixing silicon metal powder and carbonaceous powder together, heating the resultant mixture in an inert gas atmosphere such as nitrogen at a temperature of 1,400° C. or lower, thereby simultaneously effecting carbonizing and nitriding reactions of the silicon metal powder. However, since the composite powder contains no sintering aid powder, β-silicon nitride tends to be formed by this heat treatment, making it difficult to increase the percentage of α-silicon nitride in the composite powder. Since β-silicon nitride tends to grow in a needle shape, the resultant powder is likely to have a large diameter and therefore cannot easily be pulverized. From the aspect of sinterability, it is required that the composite powder has a small diameter and a high percentage of α-silicon nitride. However, this process fails to provide composite powder meeting such requirements.

There has been reported a method of producing a sintered body with high properties by sintering β-silicon nitride powder (FC Report, 1994(5), pp. 130–133), but this method requires that a particle size distribution of β-silicon nitride powder be controlled to extremely small and uniform diameters, and that it be sintered at a high temperature by a gas-pressure sintering method, making the overall process complicated. Also, it has been confirmed from this Report that the β-silicon nitride powder is poor in sinterability.

OBJECT AND SUMMARY OF THE INVENTION

It is therefore an object of the present invention to provide highly sinterable composite powder and green body of silicon nitride and silicon carbide for the manufacture of a composite sintered body with excellent mechanical strength, hardness, toughness, thermal shock resistance, wear resistance, corrosion resistance, etc.

Another object of the present invention is to provide a method of manufacturing such composite powder and green body of silicon nitride and silicon carbide.

A further object of the present invention is to provide a method of manufacturing a composite sintered body of silicon nitride and silicon carbide having excellent mechanical strength, hardness, toughness, thermal shock resistance, wear resistance, corrosion resistance, etc.

As a result of research in view of the above objects, it has been found that if a mixture of a silicon powder, a carbonaceous powder and a sintering aid powder is heat-treated under particular conditions, it is possible to obtain highly sinterable composite powder and green body of silicon nitride and silicon carbide containing a high percentage of α-silicon nitride, and that such composite powder and green body can be sintered to a composite sintered body having excellent mechanical strength, hardness, toughness, thermal shock resistance, wear resistance, corrosion resistance, etc.

The composite powder of silicon nitride and silicon carbide according to the present invention has a percentage of α-silicon nitride which is at least 30% based on all silicon nitride in the composite powder, the composite powder being produced by mixing a silicon powder with a carbonaceous powder and a sintering aid powder, and heat-treating the resultant mixed powder in a nitrogen-containing atmosphere to nitride and carbonize silicon contained in the mixed powder.

The method of manufacturing a composite powder of silicon nitride and silicon carbide according to the present invention comprises the steps of (a) mixing a silicon powder, a carbonaceous powder and a sintering aid powder, and (b) heat-treating the resultant mixed powder in a nitrogen-containing atmosphere at a temperature of 1,450° C. or lower thereby nitriding and carbonizing silicon contained in the mixed powder to produce a composite powder, a temperature elevation speed being less than 2° C./minute at least in a range from a temperature before the nitriding and carbonizing of silicon takes place to a temperature at which the composite powder is kept for nitriding and carbonizing of silicon.

The composite green body of silicon nitride and silicon carbide according to the present invention has a percentage of α-silicon nitride which is at least 30% based on all silicon nitride in the composite green body, the composite green body being produced by mixing a silicon powder with a carbonaceous powder and a sintering aid powder, molding the resultant mixed powder into a green body, and heat-treating the green body in a nitrogen-containing atmosphere to nitride and carbonize silicon contained in the green body.

The method of manufacturing a composite green body of silicon nitride and silicon carbide according to the present invention comprises the steps of (a) mixing a silicon powder, a carbonaceous powder and a sintering aid powder, (b) molding the resultant mixed powder into a green body, and (c) heat-treating the resultant green body in a nitrogen-containing atmosphere at a temperature of 1,450° C. or lower thereby nitriding and carbonizing silicon contained in the green body, a temperature elevation speed being less than 2° C./minute at least in a range from a temperature before the nitriding and carbonizing of silicon takes place to a temperature at which the green body is kept for nitriding and carbonizing of silicon.

The first method of manufacturing a composite sintered body of silicon nitride and silicon carbide according to the present invention comprises the steps of (a) molding the above composite powder, and (b) sintering the resultant green body in a nitrogen-containing atmosphere at a temperature ranging from 1,600° C. to 2,200° C.

The second method of manufacturing a composite sintered body of silicon nitride and silicon carbide according to the present invention comprises the step of sintering the above composite green body in a nitrogen-containing atmosphere at a temperature ranging from 1,600° C. to 2,200° C.

The above objects, features and advantages of the present invention will become apparent from the following descriptions.

DETAILED DESCRIPTION OF THE PREFERRED EMBODIMENTS

[1] Starting materials (a) Silicon powder

Figure 1:
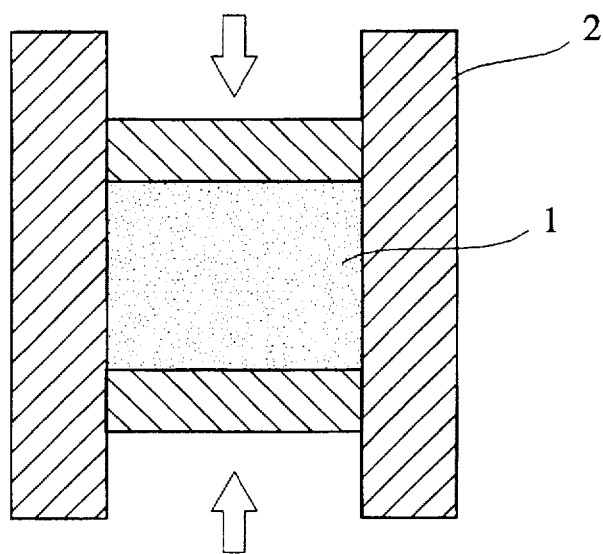
FIG. 1 is a schematic cross-sectional view of a hot-pressing graphite die for producing a composite sintered body.

A silicon powder used in the present invention has an average particle diameter ranging preferably from 0.2 μm to 20 μm, more preferably from 0.3 μm to 10 μm. If the average particle diameter is less than 0.2 μm, the surfaces of the powder particles would be oxidized excessively. If the average particle diameter is greater than 20 μm, it would be difficult to disperse the silicon powder uniformly, and the silicon powder would be poor in reactivity.

The silicon powder usable in the present invention may be of wide varieties of grades, for instance, from relatively inexpensive, low-purity silicon powder defined by JIS G2312 to expensive, high-purity silicon powder obtained by pulverizing semiconductor wafer wastes, etc. In the case of the high-purity silicon powder, Fe, Cr, Co or their compounds may be added to accelerate a nitriding and carbonizing reaction.

The content of the silicon powder in the starting materials ranges preferably from 81.2% to 97.6% by weight, more preferably from 84.2% to 93.2% by weight, based on the total weight (100% by weight) of silicon powder and carbonaceous powder. If the content of the silicon powder is less than 81.2% by weight, the resulting sintered body would not be provided with high density, failing to provide desired composite powder. If the content of the silicon powder is greater than 97.6% by weight, sufficient effects of silicon carbide would not be achieved.

(b) Carbonaceous powder

A carbonaceous powder used in the present invention is not limited to any particular type insofar as it is fine. However, the carbonaceous powder is preferably a graphite powder or a carbon black powder such as acetylene black, ketchen black, etc. The carbonaceous powder has an average particle diameter of preferably 20 μm or less and more preferably 10 μm or less. If the average particle diameter of the carbonaceous powder is greater than 20 μm, the carbonaceous powder would not be uniformly dispersed.

The content of the carbonaceous powder in the starting materials ranges preferably from 2.4% to 18.8% by weight and more preferably from 6.8% to 15.8% by weight. If the content of the carbonaceous powder is less than 2.4% by weight, sufficient effects of adding carbonaceous powder would not be achieved. If the content of the carbonaceous powder is greater than 18.8% by weight, the density of the resulting sintered body would not be high enough.

(c) Silicon nitride ($Si_3N_4$) powder

In order to improve the moldability of a silicon powder mixture, a silicon nitride ($Si_3N_4$) powder having an average particle diameter ranging preferably from 0.1 μm to 5 μm, more preferably from 0.3 μm to 3 μm, may be added as a seed for forming silicon nitride. The amount of the silicon nitride powder added ranges preferably from 0% to 10% by weight, more preferably from 3% to 8% by weight based on the total weight (100% by weight) of silicon nitride formed by the heat treatment and silicon nitride added. If the amount of the silicon nitride powder added is too large, i.e., if too much silicon nitride powder is added to the silicon powder, silicon would not be sufficiently reaction-sintered.

(d) Silicon carbide powder

In order to improve the moldability of a silicon powder mixture, a silicon carbide (SiC) powder having an average particle diameter ranging preferably from 0.1 μm to 5 μm, more preferably from 0.3 µm to 3 µm, may be added as a seed for forming silicon carbide. The amount of the silicon carbide powder added ranges preferably from 0% to 10% by weight, more preferably from 3% to 8% by weight based on the total weight (100% by weight) of the silicon carbide formed by the heat treatment and silicon carbide added. If the amount of the silicon carbide powder added is greater than 10% by weight, silicon would not sufficiently be reaction-sintered.

(e) Sintering aid powder

Preferably added to the starting materials is a sintering aid powder which may be either at least one metal oxide such as $Y_2O_3$, $Al_2O_3$, $SiO_2$, MgO, $Yb_2O_3$, $HfO_2$, $La_2O_3$, $Fe_2O_3$, $Lu_2O_3$, $Tm_2O_3$, etc., or a mixture of at least one such oxide and aluminum nitride (AlN). Particularly preferable sintering aid includes $Y_2O_3$ with or without AlN and/or $SiO_2$.

The content of the sintering aid powder added ranges preferably from 5% to 20% by weight, more preferably from 7% to 15% by weight, based on the total weight (100% by weight) of the composite powder or green body formed by the heat treatment. If the content of the sintering aid powder is less than 5% by weight, the sinterability of the resulting composite powder or green body would be insufficient. If the content of the sintering aid powder is greater than 20% by weight, the resulting sintered body would have a low high-temperature strength.

The sintering aid powder is mixed with the silicon powder and the carbonaceous powder and subjected to a nitriding and carbonizing reaction. By adding the sintering aid powder from the beginning, the percentage of α-silicon nitride in the composite powder or green body increases, and the sintering aid powder is dispersed well, thereby increasing the mechanical strength of the sintered body.

[2] Composite powder of silicon nitride and silicon carbide (1) Production of a mixed powder The above starting materials are sufficiently mixed by a ball mill, a kneader, etc. in a dry or wet mixing process. In the case of a wet mixing process, a dispersing medium such as water, ethanol, butanol, etc. is added to the powders suitably together with an organic or inorganic binder. Suitable organic binders are, for example, ethyl silicate, polyethylene glycol, polyvinyl alcohol (PVA), an acrylic emulsion, a polyurethane emulsion, etc. An inorganic binder may also be added.

(2) Nitriding/carbonization

The mixed powder is heated in a nitrogen-containing atmosphere to nitride and carbonize the silicon powder therein. The nitriding and carbonizing rates are determined depending on the amount of carbon added to the starting materials. Since substantially all carbon is bound to silicon to form silicon carbide, unreacted silicon is transformed substantially entirely into silicon nitride. If silicon and carbon are mixed at a molar ratio of 100/7, the molar ratio of silicon nitride and silicon carbide formed by the nitriding and carbonizing reaction will be 31/7.

Though conditions for nitriding and carbonizing the silicon powder in the mixed powder are changeable depending on the composition of the mixed powder, etc., the mixed powder is generally heated to a temperature of 1,450° C. or lower. If the mixed powder is heated to a temperature exceeding 1,450° C., silicon would be dissolved away or evaporated. The lower limit of the nitriding and carbonizing temperature is preferably 1,000° C. If the lower limit of the nitriding and carbonizing temperature is lower than 1,000° C., nitriding and carbonizing reactions, if any, would be too slow. Thus, the nitriding and carbonizing temperature is preferably from 1,000° C. to 1,450° C. The more preferable nitriding and carbonizing temperature is from 1,100° C. to 1,400° C.

The temperature elevation speed should be sufficiently low near the nitriding and carbonizing temperature which is kept constant, more specifically it should be less than 2° C./minute at least in a range from a temperature before the nitriding and carbonizing of silicon takes place to a temperature at which the mixed powder is kept for nitriding and carbonizing of silicon. Specifically, the temperature range in which the temperature elevation speed is less than 2° C./minute is preferably from 900° C. to 1,300° C., more preferably from 900° C. to 1,400° C. The preferred temperature elevation speed is 0.5° C./minute or less. If the temperature elevation speed is 2° C./minute or more, too vigorous nitriding reaction would take place, thereby lowering the percentage of (α-silicon nitride in the resulting composite powder and deteriorating the sinterability of the composite powder. The percentage of α-silicon nitride in the resultant composite powder is preferably 30% or more, more preferably 40% or more, of all silicon nitride in the composite powder.

The pressure of the nitrogen-containing atmosphere is preferably 1 $kgf/cm^2$ or more, more preferably from 5 $kgf/cm^2$ to 2,000 $kgf/cm^2$. If the pressure of the nitrogen-containing atmosphere is lower than 1 $kgf/cm^2$, nitriding would not sufficiently occur. The nitriding and carbonizing reaction is preferably carried out for 1–10 hours.

The term "nitrogen-containing atmosphere" used throughout the specification means a nitrogen gas or a gas containing a nitrogen gas such as a mixture of a nitrogen gas and a hydrogen gas, a mixture of a nitrogen gas and a ammonia, etc.

When the nitriding process is carried out under the above conditions, the silicon particles in the mixed powder are converted not only to silicon nitride particles containing a high proportion of α-silicon nitride by nitriding but also to finer silicon carbide particles by carbonizing, and the resultant silicon nitride particles and silicon carbide particles are finer than the starting silicon powder and carbonaceous powder.

(3) Pulverization

The heat-treated mixture of silicon nitride and silicon carbide is pulverized to fine composite powder by a ball mill, a jet mill, an attrition mill, etc. The composite powder thus produced has an average particle diameter ranging from 0.1 µm to 5 µm, preferably from 0.3 µm to 3 µm.

[3] Composite green body of silicon nitride and silicon carbide (1) Production of a green body The above starting material powders are sufficiently mixed in the same manner as described in [2] (1) above. The mixed powder is molded to a desired shape by die-pressing, slip casting, injection molding, etc. The die-pressing is carried out by a proper pressing die after removing a dispersion medium. The slip casting is carried out by casting a slurry of the mixed powder in a dispersion medium into a water-absorbing die. The injection molding is carried out by injecting the mixed powder with a proper organic or inorganic binder as described above. If the composite powder is molded to a complex shape, a slip casting method and an injection-molding method are preferable.

(2) Nitriding/carbonization

The conditions of nitriding and carbonizing reaction may essentially be the same as those described in [2] (2) above, though they should be changed to some extent depending on the thickness of the green body, diameters of the starting powders, etc. In sum, the green body is generally heated to a temperature of 1,450° C. or lower. The nitriding and carbonizing temperature is preferably from 1,000° C. to 1,450° C., and more preferably from 1,200° C. to 1,400° C.

As in the case of the composite powder, the temperature elevation speed should be less than 2° C./minute at least in a range from a temperature before the nitriding and carbonizing of silicon takes place to a temperature at which the green body is kept for nitriding and carbonizing of silicon. Specifically, the temperature elevation speed of less than 2° C./minute is kept preferably in a range from 900° C. to 1,300° C., more preferably from 900° C. to 1,400° C. The preferred temperature elevation speed is 0.5° C./minute or less. The percentage of α-silicon nitride in the resultant composite green body is preferably 30% or more, more preferably 40% or more, based on all silicon nitride in the composite green body.

The pressure of the nitrogen-containing atmosphere is preferably 1 kgf/cm² or more, more preferably from 5 kgf/cm² to 2,000 kgf/cm². The nitriding and carbonizing reaction is preferably carried out for 1–10 hours.

When the nitriding process is carried out under the above conditions, the silicon particles in the green body are converted not only to silicon nitride particles containing a high proportion of α-silicon nitride by nitriding but also to finer silicon carbide particles by carbonizing, and the resultant silicon nitride particles and silicon carbide particles are finer than the starting silicon powder and carbonaceous powder.

[4] Composite sintered body (1) First method of manufacturing a composite sintered body The first method of manufacturing a composite sintered body of silicon nitride and silicon carbide comprises the steps of (a) molding the above composite powder, and (b) sintering the resultant green body in a nitrogen-containing atmosphere at a temperature ranging from 1,600° C. to 2,200° C.

The composite powder may be produced by the method described in [2] above and molded by the same method as described in [3] (1) above. The resultant green body is sintered in a nitrogen-containing atmosphere at a temperature ranging from 1,600° C. to 2,200° C., preferably from 1,800° C. to 2,000° C. If the sintering temperature is lower than 1,600° C., the mechanical strength and toughness of the resulting sintered body would be low. If the sintering temperature is higher than 2,200° C., the silicon nitride would undesirably be decomposed.

The green body is sintered in a non-oxidizing atmosphere, preferably in a nitrogen gas atmosphere preferably at 5–2, 000 kgf/cm². The sintering temperature of the green body is preferably maintained for 1–5 hours. To achieve a high sintering density, the green body is preferably sintered by a hot isostatic pressing (HIP) method or a hot pressing (HP) method. Particularly in the case of HIP, a sintered body of a complicated shape can be produced.

(2) Second method of manufacturing a composite sintered body

The second method of manufacturing a composite sintered body of silicon nitride and silicon carbide comprises the step of sintering the above composite green body in a nitrogen-containing atmosphere at a temperature ranging from 1,600° C. to 2,200° C.

The composite green body may be produced by the method described in [3] above. The composite green body is sintered by the same method as described in [4] (1) above.

Before sintering, the composite green body may be heat-treated in an oxidizing atmosphere to oxidize surfaces of silicon nitride and silicon carbide constituting the composite green body, thereby forming a thin silicon oxide layer thereon. With this thin layer, sintering is accelerated by a reaction of silicon oxide with the sintering aid as in the case of adding silicon oxide as a sintering aid. The temperature of this heat treatment should be lower than 1,300° C.

(3) Structure of composite sintered body

A composite sintered body of silicon nitride and silicon carbide thus produced has a so-called nano-composite structure wherein fine silicon carbide particles are uniformly dispersed in silicon nitride particles. Since the silicon carbide particles have a larger coefficient of thermal expansion than the silicon nitride particles, it is considered that residual stress is exerted onto the silicon nitride particles. The fine silicon carbide particles dispersed in the silicon nitride particles appear to act as wedges to inhibit grain boundaries from slipping of silicon nitride.

Therefore, if the ratio of silicon carbide to silicon nitride is too small, sufficient effects would not be obtained. If the ratio of silicon carbide to silicon nitride is too large, too many silicon carbide particles would be dispersed, suppressing the grain growth of silicon nitride and hence preventing the density of the sintered body from sufficiently increasing. For these reasons, the weight ratio of silicon carbide to silicon nitride ranges preferably from 5/95 to 50/50, and more preferably from 15/85 to 40/60.

The present invention will be described in greater detail below with reference to Examples and Comparative Examples without intention of limiting the scope of the present invention defined by the claims attached hereto.

EXAMPLE 1

71.7% by weight of a silicon powder (JIS MSi 1) having an average particle diameter of 0.5 μm, 11.9% by weight of a carbon black powder having an average particle diameter of 0.2 μm, 3.9% by weight of a silicon nitride powder having an average particle diameter of 0.1 μm, 2.1% by weight of a silicon carbide powder having an average particle diameter of 0.2 μm, and 10.4% by weight of an yttrium oxide powder having an average particle diameter of 1.4 μm were weighed such that they had a total weight of 300 g after 100% completion of reaction, mixed for 18 hours by a ball mill with ethanol as a solvent, and then dried.

Figure 2:
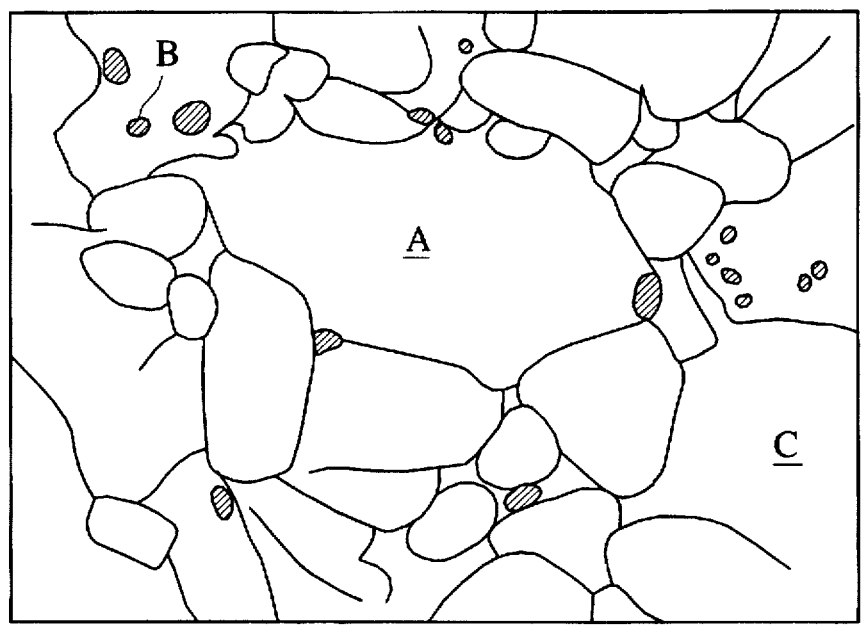
FIG. 2 is a schematic diagram showing a microstructure of a composite sintered body produced in Example 1.

As shown in FIG. 1, the mixed powder 1 thus obtained was introduced into a hot-pressing graphite die 2 having a diameter of 50 mm, and kept at a temperature of 1,400° C. for 4 hours in a nitrogen gas atmosphere under 9 kgf/cm² to cause nitriding and carbonizing reactions. The temperature was then elevated to a maximum level of 1,800° C. under a load to 5 tons in a nitrogen gas atmosphere to sinter the mixed powder for 4 hours by hot pressing, thereby obtaining a sintered body. A microscopic observation indicated that the sintered body had a nano-composite structure as schematically shown in FIG. 2 in which "A" represents a silicon nitride particle, "B" a silicon carbide particle, and "C" a phase composed of silicon, yttrium and oxygen. After measurement of a density by an Archimedean method, the resultant sintered body was measured with respect to a silicon carbide content and hardness. The results are as follows:

Sintered body density: 3.3 g/cm³.

Silicon carbide content*: 35% by weight.

Hardness (Hv)**: 2,197 kgf/mm².

*: Calculated from the quantitative analysis data of Si, C and N in the sintered body by the following equation:

$$[SiC/(SiC+Si_3N_4)] \times 100\%.$$

**: After polishing a surface of the sintered body sample by a diamond grinder, the hardness of the sample was measured by a Vickers hardness test machine under the conditions of 500 g for 10 seconds.

The sintered body was cut to test pieces each having a size of 3 mm×4 mm×40 mm, and each test piece was subjected to a three-point bending test at a room temperature and at 1,400° C. and a creep test under the following conditions:

(1) Three-point bending test (i) At room temperature: The test was conducted with a span of 30 mm at a crosshead speed of 0.5 mm/minute.

(ii) At 1,400° C: After heating the test piece at 1,400° C. for 1 hour, the test was carried out under the same conditions as in (1) (i) above.

(2) Creep test

The test piece was placed on a three-point bending jig with a span of 30 mm and heated at 1,300° C. for 1 hour. Thereafter, a predetermined load was applied to the test piece to measure the elapsed time until the test piece was broken. When the test piece was not broken after a predetermined period of time, the deformation of the test piece was observed by a high-resolution CCD camera during the test.

The results of the three-point bending test and the creep test are shown in Table 1 below.

TABLE 1

Three-point bending strength:
580 MPa at room temperature, and
591 MPa at 1,400° C.
Creep test at a load of 396 MPa for 160 hours
No breakage (maximum deformation: up to 0.15 mm).

EXAMPLES 2, 3 and Comparative Example 1

A silicon powder (JIS MSi 1) having an average particle diameter of 0.5 µm, a carbon black powder having an average particle diameter of 0.2 µm, a silicon nitride powder having an average particle diameter of 0.1 µm, a silicon carbide powder having an average particle diameter of 0.2 µm, an yttrium oxide powder having an average particle diameter of 1.4 µm, and an aluminum nitride powder having an average particle diameter of 2 µm were weighed at proportions shown in Table 2 such that they had a total weight of 300 g after 100% completion of reaction, mixed for 18 hours by a ball mill with ethanol as a solvent, and then dried. The mixed powder thus obtained was sintered by hot pressing under the same conditions as in Example 1, and the resultant sintered body was measured with respect to properties. The results are shown in Table 2.

TABLE 2

|  | Example 2 | Example 3 | Com. Ex. 1 |
|---|---|---|---|
| Powder Composition (wt. %) | | | |
| Si Powder | 72.9 | 69.9 | 80.6 |
| Carbon Black Powder | 10.4 | 11.3 | — |
| $Si_3N_4$ Powder | 4.3 | 3.9 | 7.1 |
| SiC Powder | 1.8 | 2.0 | — |
| $Y_2O_3$ Powder | 10.6 | 9.0 | 12.3 |
| AlN Powder | — | 3.9 | — |
| Properties of Sintered Body | | | |
| Density (g/cm³) | 3.2 | 3.2 | 3.0 |
| SiC Content (wt. %)(1) | 30 | 34 | 0 |
| Hardness (Hv)(2) | 2,012 | — | 1,062 |

TABLE 2-continued

|  | Example 2 | Example 3 | Com. Ex. 1 |
|---|---|---|---|
| Three-point bending strength (MPa) | | | |
| at Room Temp. | 570 | 328 | 170 |
| at 1,400° C. | 584 | 252 | —* |
| Creep | Not Broken(3) | Not Broken(4) | —* |
| Max. Deformation (mm)(5) | ≦0.14 | ≦0.21 | — |

Note:
(1)Calculated in the same manner as in Example 1.
(2)Measured in the same manner as in Example 1.
(3)The test was stopped, because the test piece was not broken for 140 hours under a load of 368 MPa.
(4)The test was stopped, because the test piece was not broken for 90 hours under a load of 190 MPa.
(5)The maximum deformation under each creep test condition.
*The high-temperature properties were not measured because of dissolution of Si.

Comparative Examples 2, 3

A silicon nitride powder (produced by a direct nitriding method, α/(α+β)=92%) having an average particle diameter of 1.2 µm, a silicon carbide powder having an average particle diameter of 1.2 µm, and an yttrium oxide powder having an average particle diameter of 1.4 µm were weighed at proportions shown in Table 3 (total weight: 300 g), mixed for 18 hours by a ball mill with ethanol as a solvent, and then dried. The mixed powder thus obtained was introduced into a graphite die having a diameter of 50 mm as shown in FIG. 1, and sintered by hot pressing under a load of 5 tons at a highest temperature of 1,800° C. in a nitrogen gas for 4 hours. The resultant sintered body was measured with respect to properties in the same manner as in Example 1. The results are shown in Table 3.

TABLE 3

|  | Com. Ex. 2 | Com. Ex. 3 |
|---|---|---|
| Powder Composition (wt. %) | | |
| $Si_3N_4$ Powder | 92.0 | 64.4 |
| SiC Powder | — | 27.6 |
| $Y_2O_3$ Powder | 8.0 | 8.0 |
| Properties of Sintered Body | | |
| Density (g/cm³) | 3.2 | 3.0 |
| SiC Content (wt. %)(1) | 0 | 30 |
| Hardness (Hv)(2) | 1,698 | 1,194 |
| Three-point bending strength (MPa) | | |
| at Room Temp. | 775 | 408 |
| at 1,400° C. | 139 | 123 |
| Creep | Broken(3) | Broken(4) |

Note:
(1)–(2)Same as under Table 2.
(3)The test piece was broken after 36 seconds under a load of 83 MPa.
(4)The test piece was broken after 1 second under a load of 83 MPa.

As can be seen from Table 3, the sintered bodies of Comparative Examples 2 and 3 which were not produced by a reactive sintering had no sufficient mechanical strength and heat resistance, because they had no nano-composite structures wherein fine silicon carbide particles existed in silicon nitride particles.

EXAMPLE 4

78.0% by weight of a silicon powder (JIS MSi 1) having an average particle diameter of 3.4 µm, 11.2% by weight of a graphite powder having an average particle diameter of 5 μm, and 10.8% by weight of an yttrium oxide powder having an average particle diameter of 1.4 μm were weighed such that they had a total weight of 300 g after 100% completion of reaction, mixed for 18 hours by a ball mill with ethanol as a solvent, and then dried.

The mixed powder thus obtained was heat-treated in a nitrogen gas atmosphere at 1,380° C. under 9 kgf/cm² for 4 hours. Thereafter, 100 parts by weight of the mixed powder was introduced into a 500-ml pot together with 200 parts by weight of ethanol and 200 parts by weight of silicon nitride balls to pulverize them by a ball mill for 7 days. A composite powder was collected after passing through a 355-μm sieve, and introduced into a graphite die 2 having a diameter of 42 mm as shown in FIG. 1. The temperature thereof was elevated to 1,850° C. under a load of 5 tons to carry out hot pressing in a nitrogen gas atmosphere under 9 kgf/cm² for 4 hours. After measuring the density of the resultant sintered body by an Archimedean method, a three-point bending test was conducted at room temperature and at high temperatures (1,300° C. and 1,400° C.) according to JIS R1601. The results are shown in Table 4.

TABLE 4

Sintered body density: 3.32 g/cm³.
Silicon carbide content*: 30% by weight.
Three-point bending strength:
  1,084 MPa at room temperature,
  1,000 MPa at 1,300° C., and
  830 MPa at 1,400° C.

EXAMPLE 5

The composite powder obtained in Example 4 was die-pressed and them subjected to cold isostatic pressing (CIP) at 4 tons/cm² to produce a green body of 55 mm×35 mm×6 mm. This green body was normal-pressure sintered at 2,000° C. in a nitrogen gas atmosphere under 9 kgf/cm² for 4 hours and then subjected to HIP at 1,850° C. in a nitrogen gas atmosphere under 1,000 kgf/cm² for 1 hour. After measurement of a density by an Archimedean method, the resultant sintered body was subjected to a three-point bending test at room temperature and at a high temperature (1,400° C.) according to JIS R1601, and a creep test. The results are shown in Table 5.

TABLE 5

Sintered body density: 3.29 g/cm³.
Silicon carbide content*: 30% by weight.
Three-point bending strength:
  958 MPa at room temperature,
  756 MPa at 1,400° C.
Creep test at a load of 592 MPa for 90 hours
  No breakage (maximum deformation: up to 0.07 mm).

EXAMPLE 6

(1) Production of composite powder

A silicon powder (JIS MSi 1) having an average particle diameter of 0.5 μm, a carbon powder as a carbonaceous material having an average particle diameter of 5 μm or less, a silicon nitride powder having an average particle diameter of 0.1 μm, a silicon carbide powder having an average particle diameter of 0.2 μm, an yttrium oxide powder having an average particle diameter of 1.4 μm, and an aluminum nitride powder having an average particle diameter of 2 μm were weighed as shown in Table 6, mixed for 18 hours by a ball mill with 80 parts by weight of balls and 200 parts by weight of ethanol as a solvent, and then dried.

The mixed powder thus obtained was introduced into a reactor. By heating the mixed powder to 1,380° C. at a temperature elevation speed of 0.5° C./minute (from 1,300° C. to 1,380° C.) and keeping it at 1,380° C. for 60 minutes, it was nitrided and carbonized in a nitrogen gas atmosphere under a pressure of 9 kgf/cm². Thereafter, 100 parts by weight of the mixed powder was introduced into a 2-liter polyethylene pot together with 200 parts by weight of ethanol and 200 parts by weight of silicon nitride balls for ball-milling for 7 days to prepare a composite powder.

The composite powder thus obtained was subjected to an X-ray diffraction measurement to determine crystalline phases of α-silicon nitride and β-silicon nitride, and the percentage of α-silicon nitride in all silicon nitride was determined by the equation: Percentage (%) of $\alpha\text{-}Si_3N_4$ = {total diffraction intensity of (102) and (210) faces $(\alpha\text{-}Si_3N_4)$/[total diffraction intensity of (102) and (210) faces $(\alpha\text{-}Si_3N_4)$+total diffraction intensity of (101) and (210) faces $(\beta\text{-}Si_3N_4)$]}×100.

The results are shown in Table 12.

TABLE 6

| Powder Composition | Weight (g) | % by Weight |
|---|---|---|
| Si Powder | 270.7 | 69.9 |
| C Powder | 43.7 | 11.3 |
| $Si_3N_4$ Powder | 14.9 | 3.9 |
| SiC Powder | 7.7 | 2.0 |
| $Y_2O_3$ Powder | 35.0 | 9.0 |
| AlN Powder | 15.0 | 3.9 |

(2) Production of composite sintered body

The composite powder produced in the above step (1) was preliminarily die-pressed at 200 kgf/cm² to a size of 55 mm ×35 mm×6 mm and then subjected to CIP at 4 tons/cm². The resultant green body was sintered by HIP at a highest temperature of 1,850° C. under a maximum nitrogen gas pressure of 1,000 kgf/cm² to produce a composite sintered body of silicon nitride and silicon carbide. A microscopic observation indicated that the sintered body had a nano-composite structure.

(3) Properties of composite sintered body

The density of the composite sintered body was measured by an Archimedean method. A test piece of 3 mm×4 mm×40 mm cut from the composite sintered body was subjected to a three-point bending test at a room temperature and 1,400° C. according to JIS R1601 in the same manner as in Example 1. The test piece was also measured with respect to fracture toughness $K_{IC}$ according to a single edge notched beam (SENB) method. The results of the three-point bending test and the fracture toughness test are shown in Table 12.

EXAMPLE 7

The composite powder of silicon nitride and silicon carbide obtained in Example 6 was die-pressed and subjected to CIP under the same conditions as in Example 6. The resulting green body was then subjected to normal-pressure sintering at 1,500° C. in a nitrogen gas atmosphere for 2 hours to produce a composite sintered body. The composite sintered body was measured with respect to mechanical strength and fracture toughness $K_{IC}$ in the same manner as in Example 6. The results are shown in Table 12.

EXAMPLE 8

(1) Production of composite powder

A silicon powder (JIS MSi 1) having an average particle diameter of 0.5 µm, an acetylene black powder having an average particle diameter of 500 Å, a silicon nitride powder having an average particle diameter of 0.1 µm, a silicon carbide powder having an average particle diameter of 0.2 µm, and an yttrium oxide powder having an average particle diameter of 1.4 µm were weighed at proportions shown in Table 7, mixed for 18 hours by a ball mill with 80 parts by weight of balls and 200 parts by weight of ethanol as a solvent, and then dried.

TABLE 7

| Powder Composition | Weight (g) | % by Weight |
|---|---|---|
| Si Powder | 274.9 | 72.9 |
| C Powder | 39.4 | 10.4 |
| $Si_3N_4$ Powder | 16.1 | 4.3 |
| SiC Powder | 6.9 | 1.8 |
| $Y_2O_3$ Powder | 40.0 | 10.6 |

The mixed powder thus obtained was introduced into a reactor and heated to 1,380° C. at a temperature elevation speed of 0.5° C./minute (from 1,300° C. to 1,380° C.). The nitriding and carbonizing treatment was finished without keeping the mixed powder at 1,380° C. in a nitrogen gas atmosphere under a pressure of 9 kgf/cm². 100 parts by weight of the treated mixed powder was introduced into a 2-liter polyethylene pot together with 200 parts by weight of ethanol and 200 parts by weight of silicon nitride balls, and ball-milled for 7 days to provide a composite powder. The percentage of α-silicon nitride in the resultant composite powder was determined in the same manner as in Example 6. The results are shown in Table 12.

(2) Production of composite sintered body

The composite powder produced in the above step (1) was introduced into a hot-pressing graphite die having a diameter of 42 mm, and heated to 1,850° C. under a load of 4.8 tons for hot pressing in a nitrogen gas atmosphere under 9 kgf/cm², thereby producing a composite sintered body of silicon nitride and silicon carbide. A microscopic observation indicated that the sintered body had a nano-composite structure. The composite sintered body was measured with respect to properties in the same manner as in Example 6. The results are shown in Table 12.

EXAMPLE 9

Composite powder and sintered body of silicon nitride and silicon carbide were produced in the same manner as in Example 8 except that a silicon powder (JIS MSi 1) having an average particle diameter of 3.4 µm was used. The percentage of α-silicon nitride in the resultant composite powder was determined, and the properties of the sintered body were measured in the same manner as in Example 6. The results are shown in Table 12.

Comparative Example 4

Using the same mixed powder as in Example 6, a nitriding and carbonization reaction was conducted under the same conditions as in Example 6 except that the temperature elevation speed was changed to 2° C./minute from 1,300° C. After heat treatment, it was ball-milled for 7 days in the same manner as in Example 6.

The resultant composite powder of silicon nitride and silicon carbide was molded and subjected to HIP sintering under the same conditions as in Example 6. The resultant composite sintered body was measured with respect to mechanical strength and fracture toughness $K_{IC}$ in the same manner as in Example 6. The results are shown in Table 12.

Comparative Example 5

Using the same mixed powder as in Example 6 except that an acetylene black powder was used as a carbonaceous powder, a nitriding and carbonization reaction was conducted under the same conditions as in Comparative Example 4. After heat treatment, it was ball-milled for 7 days in the same manner as in Example 6.

The resultant composite powder of silicon nitride and silicon carbide was molded and subjected to HIP sintering under the same conditions as in Example 6. The resultant composite sintered body was measured with respect to mechanical strength and fracture toughness $K_{IC}$ in the same manner as in Example 6. The results are shown in Table 12.

Figure 3:
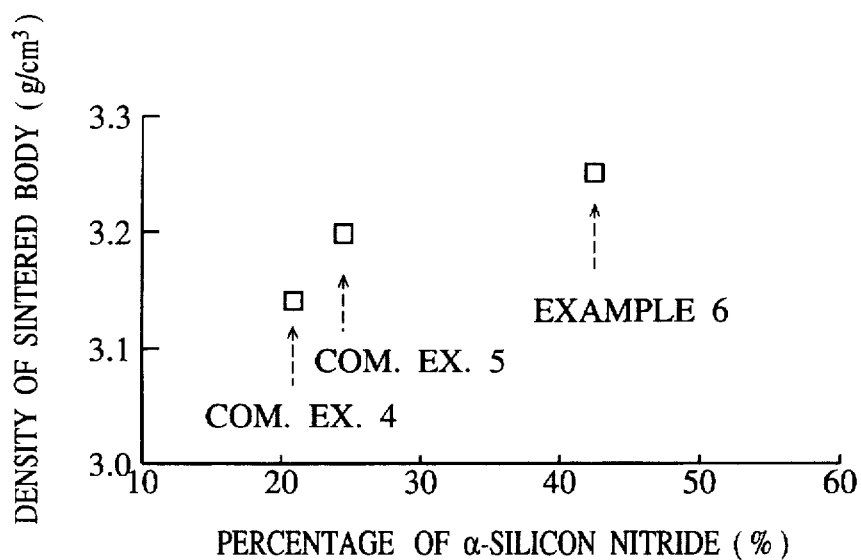
FIG. 3 is a graph showing the relationship between the sintering density and the percentage of α-silicon nitride in composite sintered bodies in Example 6 and Comparative Examples 4 and 5.
Figure 4:
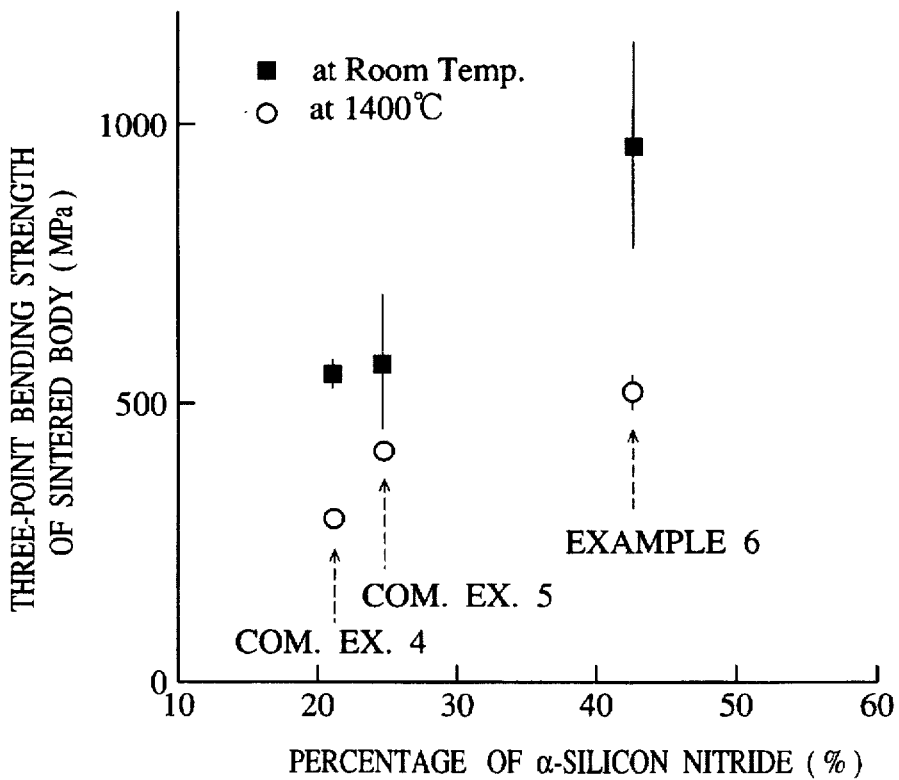
FIG. 4 is a graph showing the relationship between the bending strength and the percentage of α-silicon nitride in the composite sintered bodies in Example 6 and Comparative Examples 4 and 5.

With respect to the composite sintered bodies of Example 6 and Comparative Examples 4 and 5, FIG. 3 shows the relationships between their sintering densities and their percentages of α-silicon nitride, and FIG. 4 shows the relationships between their three-point bending strength and their percentages of α-silicon nitride. It is clear from these data that the composite sintered body of Example 6 has higher density and three-point bending strength than those of Comparative Examples 4 and 5.

Comparative Example 6

The composite powder of silicon nitride and silicon carbide produced in Comparative Example 5 was molded and subjected to CIP under the same conditions as in Example 6. The resulting green body was subjected to normal-pressure sintering under the same conditions as in Example 7. The resultant composite sintered body was measured with respect to mechanical strength and fracture toughness $K_{IC}$ in the same manner as in Example 6. The results are shown in Table 12.

Comparative Example 7

The same powders as in Example 6 without yttrium oxide powder and aluminum nitride powder were weighed at proportions shown in Table 8, and mixed by a ball mill under the same conditions as in Example 6, and then dried.

TABLE 8

| Powder Composition | Weight (g) | % by Weight |
|---|---|---|
| Si Powder | 300.6 | 80.4 |
| C Powder | 48.5 | 13.0 |
| $Si_3N_4$ Powder | 16.5 | 4.4 |
| SiC Powder | 8.5 | 2.3 |

The mixed powder thus obtained was introduced into a reactor and then nitrided and carbonized under the same conditions as in Example 6. 90% by weight of the heat-treated composite powder, 7% by weight of an yttrium oxide powder having an average particle diameter of 1.4 µm and 3% by weight of aluminum nitride having an average particle diameter of 2 µm were mixed, and 100 parts by weight of the resultant mixture was introduced into a 2-liter polyethylene pot together with 200 parts by weight of ethanol, and 200 parts by weight of silicon nitride balls. The powder mixture was ball-milled for 7 days to produce a composite powder having the same composition as Example 6. The percentage of α-silicon nitride in the composite powder was determined in the same manner as in Example 6. The results are shown in Table 12.

The composite powder of silicon nitride and silicon carbide was molded and subjected to HIP sintering under the same conditions as in Example 6 to produce a composite sintered body of silicon nitride and silicon carbide. The composite sintered body was measured with respect to mechanical strength and fracture toughness $K_{IC}$. The results are shown in Table 12.

EXAMPLE 10

(1) Production of composite powder

A silicon powder (JIS MSi 1) having an average particle diameter of 0.7 μm, carbon powder having a particle diameter of 5 μm or less, and $Lu_2O_3$ powder having an average particle diameter of 1 μm were weighed at proportions shown in Table 9, mixed for 18 hours by a ball mill with 100 parts by weight of balls and 200 parts by weight of ethanol as a solvent, and then dried.

TABLE 9

| Powder Composition | Weight (g) | % by Weight |
| --- | --- | --- |
| Si Powder | 270.1 | 71.2 |
| C Powder | 38.7 | 10.2 |
| $Lu_2O_3$ Powder | 70.5 | 18.6 |

The mixed powder thus obtained was introduced into a reactor and heated to 1,230° C. at a temperature elevation speed of 0.5° C./minute (from 1,150° C. to 1,230° C.), and kept at 1,230° C. for 60 minutes. A nitriding and carbonizing reaction was carried out in a nitrogen gas atmosphere under a pressure of 9 kgf/cm². 100 parts by weight of the treated mixed powder was introduced into a 2-liter polyethylene pot together with 200 parts by weight of ethanol and 200 parts by weight of silicon nitride balls, and ball-milled for 7 days to provide a composite powder. The percentage of α-silicon nitride in the resultant composite powder was determined in the same manner as in Example 6. The results are shown in Table 12.

(2) Production of composite sintered body

The composite powder produced in the above step (1) was molded under the same conditions as in Example 6, subjected to normal-pressure sintering at 2,000° C. in a nitrogen gas atmosphere under a pressure of 9 kgf/cm² for 4 hours, and then subjected to HIP sintering at 1,850° C. in a nitrogen gas atmosphere under a pressure of 1,000 kgf/cm² for 1 hour. The resultant composite sintered body was measured with respect to mechanical strength and fracture toughness $K_{IC}$ in the same manner as in Example 6. The results are shown in Table 12.

EXAMPLE 11

(1) Production of composite powder silicon powder (JIS MSi 1) having an average particle diameter of 0.7 μm, an acetylene black powder having a particle diameter of 5 μm or less, $Lu_2O_3$ powder having an average particle diameter of 1 μm and AlN powder having an average particle diameter of 2 μm were weighed at proportions shown in Table 10, and 100 parts by weight of the resultant mixture was mixed for 18 hours by a ball mill with 100 parts by weight of balls and 200 parts by weight of ethanol as a solvent, and then dried.

TABLE 10

| Powder Composition | Weight (g) | % by Weight |
| --- | --- | --- |
| Si Powder | 266.3 | 69.9 |
| C Powder | 38.1 | 10.0 |
| $Lu_2O_3$ Powder | 61.7 | 16.2 |
| AlN Powder | 15.0 | 3.9 |

After completing a nitriding and carbonizing reaction of the resultant mixed powder in the same manner as in Example 10, 100 parts by weight of the powder was introduced into a 2-liter polyethylene pot together with 200 parts by weight of ethanol and 200 parts by weight of silicon nitride balls. It was ball-milled for 7 days to provide a composite powder. The percentage of α-silicon nitride in the resultant composite powder was determined in the same manner as in Example 6. The results are shown in Table 12.

(2) Production of composite sintered body

The composite powder produced in the above step (1) was molded and subjected to normal-pressure sintering and HIP sintering in the same conditions as in Example 10. The resultant composite sintered body was measured with respect to mechanical strength and fracture toughness $K_{IC}$ in the same manner as in Example 6. The results are shown in Table 12.

Comparative Example 8

Using the same powder materials as in Example 11 at proportions shown in Table 11 except that $Lu_2O_3$ powder as a sintering aid was replaced by $In_2O_3$ powder having an average particle diameter of 1 μm, they were mixed by a ball mill for 18 hours with 200 parts by weight of ethanol and 100 parts by weight of silicon nitride balls, and then dried.

TABLE 11

| Powder Composition | Weight (g) | % by Weight |
| --- | --- | --- |
| Si Powder | 278.0 | 74.0 |
| C Powder | 39.8 | 10.6 |
| $In_2O_3$ Powder | 43.0 | 11.4 |
| AlN Powder | 15.0 | 4.0 |

After completing a nitriding and carbonizing reaction of the resultant mixed powder in the same manner as in Example 10, it was introduced into a 2-liter polyethylene pot together with 200 parts by weight of ethanol and 200 parts by weight of silicon nitride balls. It was ball-milled for 7 days to provide a composite powder. The percentage of α-silicon nitride in the resultant composite powder was determined in the same manner as in Example 6. The results are shown in Table 12.

The resultant composite powder of silicon nitride and silicon carbide was molded under the same conditions as in Example 6 and subjected to normal-pressure sintering and HIP sintering under the same conditions as in Example 10. The resultant composite sintered body was measured with respect to mechanical strength and fracture toughness $K_{IC}$ in the same manner as in Example 6. The results are shown in Table 12.

TABLE 12

| No. | α-Si$_3$N$_4$$^{(1)}$ | Three-Point Bending Strength (MPa) at R. T. | Three-Point Bending Strength (MPa) at 1,400° C. | Fracture Toughness (MPa · m$^{1/2}$) | Sintering Density (g/cm$^3$) |
|---|---|---|---|---|---|
| Example | | | | | |
| 6 | 42.5 | 960.5 | 518.5 | 8.1 | 3.25 |
| 7 | 42.5 | 702.9 | 495.4 | —$^{(2)}$ | 3.28 |
| 8 | 32.3 | 1038.2 | 727.3 | —$^{(2)}$ | 3.31 |
| 9 | 42.3 | 1084.2 | 830.3 | —$^{(2)}$ | 3.32 |
| 10 | 52.5 | 965.7 | 624.8 | 8.0 | 3.54 |
| 11 | 49.4 | 719.4 | 514.9 | 9.1 | 3.49 |
| Comparative Example | | | | | |
| 4 | 20.8 | 552.5 | 293.1 | 7.0 | 3.14 |
| 5 | 24.4 | 572.1 | 412.5 | —$^{(2)}$ | 3.20 |
| 6 | 24.4 | 470.8 | 181.1 | 5.1 | 3.10 |
| 7 | 5.3 | 397.4 | 108.2 | —$^{(2)}$ | 3.28 |
| 8 | 20.4 | —$^{(3)}$ | —$^{(3)}$ | —$^{(2)}$ | 1.81 |

Note:
$^{(1)}$Percentage (%) of α-Si$_3$N$_4$ in composite powder = {total diffraction intensity of (102) and (210) faces (α-Si$_3$N$_4$ )/[total diffraction intensity of (102) and (210) faces (α-Si$_3$N$_4$ ) + total diffraction intensity of (101) and (210) faces (β-Si$_3$N$_4$ )]} × 100.
$^{(2)}$Not measured.
$^{(3)}$Not measured, because a dense sintered body was not produced.

As is clear from Table 12, the percentage of α-Si$_3$N$_4$ was much smaller in the composite powders of Comparative Examples 4–6 in which the temperature elevation speed was 2° C./minute during the nitriding and carbonization reaction than in the composite powders of Examples 6–9 in which the temperature elevation speed was 0.5° C./minute during the nitriding and carbonization reaction. Also, the percentage of α-Si$_3$N$_4$ was much smaller in Comparative Example 7 in which no sintering aid was used and in Comparative Example 8 in which a sintering aid was In$_2$O$_3$ powder than in Examples 6, 10 and 11.

EXAMPLE 12

(1) Production of composite powder

Silicon powder (JIS MSi 1) having an average particle diameter of 0.5 μm, carbon powder having a particle diameter of 5 μm or less, a silicon nitride powder having an average particle diameter of 0.1 μm, a silicon carbide powder having an average particle diameter of 0.2 μm, and an yttrium oxide powder having an average particle diameter of 1.4 μm were weighed at proportions shown in Table 13, mixed for 18 hours by a ball mill with 100 parts by weight of balls and 200 parts by weight of ethanol as a solvent, and then dried.

TABLE 13

| Powder Composition | Weight (g) | % by Weight |
|---|---|---|
| Si Powder | 274.9 | 72.9 |
| C Powder | 39.4 | 10.4 |
| Si$_3$N$_4$ Powder | 16.1 | 4.3 |
| SiC Powder | 6.9 | 1.8 |
| Y$_2$O$_3$ Powder | 40.0 | 10.6 |

The mixed powder was preliminarily molded to a size of 55 mm×35 mm×6 mm and then subjected to CIP at 4 tons/cm$^2$. The resultant green body was introduced into a reactor, heated to 1,450° C. at a temperature elevation speed of 0.5° C./minute (from 1,200° C. to 1,450° C.), and kept at 1,450° C. for 30 minutes to carry out a nitriding and carbonizing reaction in a mixed gas atmosphere of 20 volume % of a hydrogen gas and 80 volume % of a nitrogen gas at 9 kgf/cm$^2$. The percentage of (α-silicon nitride in the resulting composite green body was determined in the same manner as in Example 6. The results are shown in Table 16.

(2) Production of composite sintered body

The composite green body produced in the above step (1) was subjected to normal-pressure sintering at 2,050° C. in a nitrogen gas atmosphere under a pressure of 9 kgf/cm$^2$ for 4 hours, and then subjected to HIP sintering at 1,900° C. in a nitrogen gas atmosphere under a pressure of 1,000 kgf/cm$^2$ for 1 hour. A microscopic observation indicated that the composite sintered body had a nano-composite structure. The composite sintered body was measured with respect to mechanical strength in the same manner as in Example 6. The results are shown in Table 16.

EXAMPLE 13

(1) Production of composite green body

The mixed powder obtained in Example 12 was molded and subjected to a nitriding and carbonization reaction under the same conditions as in Example 12 to prepare a composite green body. The percentage of α-silicon nitride in the composite green body was determined in the same manner as in Example 6. The results are shown in Table 16.

(2) Production of composite sintered body

The composite green body produced in the above step (1) was treated in an oxidizing atmosphere at 700° C. for 24 hours, and then subjected to normal-pressure sintering and HIP sintering under the same conditions as in Example 12. The composite sintered body was measured with respect to mechanical strength in the same manner as in Example 6. The results are shown in Table 16.

EXAMPLE 14

(1) Production of composite green body

The mixed powder used in Example 12 was mixed with SiO$_2$ powder having an average particle diameter of 1 μm at proportions shown in Table 14 and dried under the same conditions as in Example 12. The resulting mixture was molded and subjected to a nitriding and carbonization reaction under the same conditions as in Example 12 to prepare a composite green body. The percentage of α-silicon nitride in the composite green body was determined in the same manner as in Example 6. The results are shown in Table 16.

TABLE 14

| Powder Composition | Weight (g) | % by Weight |
|---|---|---|
| Si Powder | 164.6 | 72.7 |
| C Powder | 23.6 | 10.4 |
| Si$_3$N$_4$ Powder | 9.7 | 4.3 |
| SiC Powder | 4.1 | 1.8 |
| Y$_2$O$_3$ Powder | 24.0 | 10.6 |
| SiO$_2$ Powder | 0.4 | 0.2 |

(2) Production of composite sintered body

The composite green body produced in the above step (1) was subjected to normal-pressure sintering and HIP sintering under the same conditions as in Example 12. The composite sintered body was measured with respect to mechanical strength in the same manner as in Example 6. The results are shown in Table 16.

Comparative Example 9

(1) Production of composite green body

The mixed powder obtained in Example 12 was molded and subjected to a nitriding and carbonization reaction under the same conditions as in Example 12 to prepare a composite green body. The percentage of α-silicon nitride in the composite green body was determined in the same manner as in Example 6. The results are shown in Table 16.

(2) Production of composite sintered body

The composite green body produced in the above step (1) was treated in an oxidizing atmosphere at 1,300° C. for 24 hours, and then subjected to normal-pressure sintering under the same conditions as in Example 12. However, since the composite sintered body was decomposed, it was impossible to conduct a density measurement, and the experiments were stopped.

Table 15 shows the target compositions of composite sintered bodies based on which the amount of each powder was determined in Examples 6–14 and Comparative Examples 4–9.

TABLE 15

| No. | Sintering Aid | Matrix (wt. %)[1] Total | $Si_3N_4$/SiC |
|---|---|---|---|
| Example | | | |
| 6 | 7 wt. % $Y_2O_3$ + 3 wt. % AlN | 90[2] | 66/34 |
| 7 | 7 wt. % $Y_2O_3$ + 3 wt. % AlN | 90[2] | 66/34 |
| 8 | 8 wt. % $Y_2O_3$ | 92[2] | 70/30 |
| 9 | 8 wt. % $Y_2O_3$ | 92[2] | 70/30 |
| 10 | 14.1 wt. % $Lu_2O_3$ | 85.9 | 70/30 |
| 11 | 12.34 wt. % $Lu_2O_3$ + 3 wt. % AlN | 84.66 | 70/30 |
| 12 | 8 wt. % $Y_2O_3$ | 92[2] | 70/30 |
| 13 | 8 wt. % $Y_2O_3$ | 92[2] | 70/30 |
| 14 | 8 wt. % $Y_2O_3$ + 0.14 wt. % $SiO_2$ | 91.86[2] | 70/30 |
| Comparative Example | | | |
| 4 | 7 wt. % $Y_2O_3$ + 3 wt. % AlN | 90[2] | 66/34 |
| 5 | 7 wt. % $Y_2O_3$ + 3 wt. % AlN | 90[2] | 66/34 |
| 6 | 7 wt. % $Y_2O_3$ + 3 wt. % AlN | 90[2] | 66/34 |
| 7 | | 100[2] | 66/34 |
| 8 | 8.61 wt. % $In_2O_3$ + 3 wt. % AlN | 88.39 | 70/30 |
| 9 | 8 wt. % $Y_2O_3$ | 92[2] | 70/30 |

Note:
[1]"Total" means a total weight of the $Si_3N_4$-SiC matrix, and "$Si_3N_4$/SiC" means a weight ration of $Si_3N_4$ to SiC in the matrix.
[2]Including silicon nitride and silicon carbide each 5 weight % added as seeds to the starting powder materials.

TABLE 16

| Properties | Ex. 12 | Ex. 13 | Ex. 14 | Com. Ex. 9 |
|---|---|---|---|---|
| Percentage of α-$Si_3N_4$ (%)[1] | 100 | 100 | 100 | 100 |
| Three-point bending strength (MPa) | | | | |
| at Room Temp. | 575.1 | 730.3 | 563.6 | — |
| at 1,400° C. | 491.2 | 606.6 | 629.8 | — |
| Density (g/cm³) | 3.27 | 3.29 | 3.30 | —[2] |

TABLE 16-continued

| Properties | Ex. 12 | Ex. 13 | Ex. 14 | Com. Ex. 9 |
|---|---|---|---|---|

Note:
[1]Percentage (%) of α-$Si_3N_4$ in composite green body = {total diffraction intensity of (102) and (210) faces (α:-$Si_3N_4$)/[total diffraction intensity of (102) and (210) faces (α-$Si_3N_4$) + total diffraction intensity of (101) and (210) faces (β-$Si_3N_4$)]} × 100.
[2]Not measured.

As is clear from the above data, the composite green bodies of Examples 12–14 have high percentages of α-silicon nitride, and the composite sintered bodies produced therefrom show high bending strength and density.

As described above, since a mixture of a silicon powder, a carbonaceous powder and a sintering aid powder is used as starting materials, and since silicon is nitrided and carbonized by a heat treatment in a nitrogen-containing atmosphere, the resulting composite powder and green body has a high percentage of α-silicon nitride. The composite sintered body can be produced from such composite powder or green body at a low cost, and the composite sintered body has a nano-composite structure in which fine silicon carbide particles are uniformly dispersed in silicon nitride particles. Accordingly, the composite sintered bodies of silicon nitride and silicon carbide have excellent mechanical strength, hardness, toughness, thermal shock resistance, wear resistance, corrosion resistance, etc. Such composite sintered bodies are suitable as structural members for gas turbines, automobile engines, etc. operable at high temperatures, and sliding members for rocker arms, etc.

What is claimed is:

1. A composite powder comprising silicon nitride, silicon carbide and a sintering aid which is either at least one metal oxide selected from the group consisting of $Y_2O_3$, $Al_2O_3$, $SiO_2$, MgO, $Yb_2O_3$, $HfO_2$, $La_2O_3$, $Fe_2O_3$, $Lu_2O_3$ and $Tm_2D_3$ or a mixture of said at least one metal oxide and aluminum nitride, and having a crystallized phase of α-silicon nitride in an amount of at least 30% based on all silicon nitride in said composite powder, said composite powder being produced by heat-treating a powder mixture comprising a silicon powder, a carbonaceous powder and said sintering aid powder in a nitrogen-containing atmosphere to nitride and carbonize silicon contained in said powder mixture, a content of said silicon powder being 81.2 to 97.6% by weight based on a total weight of said silicon powder and said carbonaceous powder, a content of said carbonaceous powder being 2.4 to 18.8% by weight based on a total weight of said silicon powder and said carbonaceous powder, and a content of said sintering aid powder being 5 to 20% by weight based on a total weight of said composite powder formed by said heat treatment.

2. The composite powder of silicon nitride and silicon carbide according to claim 1, wherein said powder mixture further comprises silicon nitride and/or silicon carbide.

3. The composite powder of silicon nitride and silicon carbide according to claim 1, wherein a weight ratio of silicon carbide to silicon nitride ranges from 5/95 to 50/50.

* * * * *